United States Patent
Helf, Jr. et al.

[11] 3,764,995
[45] Oct. 9, 1973

[54] PROGRAMMABLE TEST SYSTEMS

[75] Inventors: William Helf, Jr., East Northport, N.Y.; William M. Chandler, Florissant, Mo.

[73] Assignee: PRD Electronics, Inc., Syosset, N.Y.

[22] Filed: Dec. 21, 1971

[21] Appl. No.: 210,437

[52] U.S. Cl.............. 340/172.5, 235/151.31, 324/73
[51] Int. Cl. ............................................ G06f 11/04
[58] Field of Search................................ 340/172.5; 235/151.31; 324/73

[56] References Cited
UNITED STATES PATENTS

| | | | |
|---|---|---|---|
| 3,631,229 | 12/1971 | Beus et al. ..................... | 340/172.5 |
| 3,599,161 | 8/1971 | Stoughton et al................ | 340/172.5 |
| 3,465,298 | 9/1969 | La Duke et al.................. | 340/172.5 |
| 3,546,582 | 12/1970 | Barnard et al. .................. | 324/73 R |

*Primary Examiner*—Paul J. Henon
*Assistant Examiner*—John P. Vandenburg
*Attorney*—Donald R. Greene

[57] ABSTRACT

A programmable test system includes a system computer for storing information encompassing test programs and for issuing, when requested, instructions in the form of digital code words for implementing the test programs. Instructions from the system computer are requested by a data transfer unit which, in turn, supplies the instructions incorporating address information, function commands and data commands to a stimulus and measurement sub-system. The latter contains functional modules which are organized by the instructions to assume a test configuration for supplying input stimuli to an electronic unit under test and to measure the response of the unit under test to those stimuli. Each functional module required by a specific test program is programmed in sequence by the function commands, to adopt a test setup in which a specific function is to be performed by the module, such as the generation of a low frequency signal, or the measurement of an AC signal from the unit under test, within its functional capabilities. Each functional module may also be supplied with data commands within the test instructions, as necessary to impose specific numerical restrictions or the like upon the functions to be performed, such as assigning amplitude and frequency information to the generated signal, or specifying amplitude range and operational mode in which the response of the unit under test is to be measured. The functional modules may be reorganized as required to perform tests on dissimilar electronic units.

7 Claims, 12 Drawing Figures

3,764,995

PROGRAMMABLE TEST SYSTEMS

BACKGROUND OF THE INVENTION

1. Field

This invention pertains to automatic testing and measuring equipment for electronic circuits and systems (hereinafter referred to as "units under test"), capable of determining whether a given unit under test is operating within predetermined suitable limits.

2. Prior Art

Heretofore a wide variety of test systems have been proposed and/or developed to measure the response of a unit under test to preselected applied stimuli. The purpose of these systems has been to determine whether the unit under test is operating, or is operable, in accordance with preestablished operational criteria. If as a result of the testing procedure the operational parameters of the unit are found to be proper it may be placed back in service or used as an inventory item for future replacement of a working unit. If a fault or failure is found to be present in the unit, appropriate measures are taken to return the unit to an operative condition. A significant disadvantage of prior testing and measuring systems of this type is that they have largely been hard wired, specifically configured equipments designed solely for testing only one unit or a set of a small number of closely related units having similar responses to similar stimuli. As a consequence it has been necessary to maintain a relatively large inventory of costly test equipments where large numbers of unrelated electronics systems are in use and are to be subjected to frequent periodic test and maintenance procedures. For example, rigid test procedures have been essential to establish that avionic equipment is operating properly in an aircraft. Obviously in any field where the total cost of the principal and peripheral equipments is considerable and considerations of public safety are also involved, it is essential that a continuous program be undertaken to assure that these equipments are maintained in proper operating condition. Where the field is also dynamic in the sense that it is undergoing continuous and rapid evolution, as is true of the aircraft industry, it is not unusual for a costly piece of test equipment to become obsolete within a short time after its introduction simply as a consequence of the obsolescence of the system or circuits which the test equipment is designed to accommodate.

SUMMARY OF THE INVENTION

The present invention provides a general purpose computer-control automatic electronic systems tester which is compatible with a large number of substantially unrelated electronic units to be tested. Furthermore the tester maintains this flexibility or versatility by virtue of its adaptability to configuration or reconfiguration to test newly designed electronics systems and circuits without departure from its previous test capabilities.

Briefly, automatic test equipment of the present invention is adaptable for detecting malfunctions of any of a plurality of dissimilar electronic units. By "dissimilar" is meant units whose operating functions differ to such an extent that input stimuli suitable for one may normally evoke no response from another, may normally cause the destruction of a third, and so forth. The units may be analog or digital in nature, or both. Moreover, with appropriate transducers the test equipment may be used to test fluidic units as well as electronic units.

The test equipment comprises a computer station and a test station, but this does not imply that the two may not be physically at the same location. Rather, under certain conditions it may be desirable for more than a single test station to have access to, i.e., to acquire, the computer station in the interest of conservation of computer time. Hence, the designation of two distinct stations is simply to characterize their separate capabilities. The computer station has a plurality of stores, such as magnetic tapes, containing test programs which are applicable to the various electronic units to be tested. Program selection means are provided for selective retrieval of the test program applicable to the specific unit selected for test. In addition, as the name implies, the computer station includes a computer with sufficient memory to generate appropriate test instructions designating tests to be performed on the selected unit in accordance with the retrieved test program.

At the test station, a data transfer unit responds to the instruction commands issued by the computer to ascertain whether those commands are to be implemented by that unit or are to be through-putted to a stimulus and measurement subsystem which contain functional modules or "building blocks" normally unconnected to one another. The functional modules may broadly be categorized as sources, sensors, loads, and interfaces, and each is programmable to respond to a command addressed (as by identity codes which are locally decoded) thereto to assume a state resulting in a coupled configuration of the modules by which appropriate tests are performed on the selected unit. Modules such as signal generators, function generators, pulse generators, power supplies and the like are sources. Sensors include such modules as frequency meters, digital multimeters, power meters, voltmeters, spectrum analyzers, and oscilloscopes. Loads include feedback simulators, transformers, and various dissipative devices such as precision and high power resistances. Modules within the category of interfaces include switches and other devices which permit coupling of diverse electronic equipments. It is not intended that these categories be restrictive, of course, since it is entirely possible that a single module may have functions crossing two categories. For example, a synchro/resolver is both a source and a sensor. The same comment applies to a servo analyzer. Thus, these categories are intended simply as convenient designations, rather than as limitations on the invention.

In response to commands from the data transfer unit, the stimulus section functional modules assume states resulting in a configuration by which appropriate stimuli are supplied to the unit under test for carrying out the test thereon. Typically, a sequence of tests is performed on the unit in order to permit a complete evaluation of its operational performance. The response of the unit to the stimuli called for in any given test is supplied to the measurement section whose functional modules have also assumed states, based on the commands supplied via the data transfer unit, resulting in a coupled configuration for measuring the unit's response and for generating test data indicative of that response.

The test data is furnished to the computer where it is evaluated by comparison with the acceptable response of the unit to the applied stimuli, as obtained from the computer memory. On the basis of that evaluation the operational performance of the unit is either acceptable or unacceptable under the conditions imposed by the specific test from which the data has been gathered. In the event of unacceptability of performance in any given test, the computer stops the test program and issues a test instruction to the data transfer unit where the instruction is decoded and displayed as an indication to the operator that the unit has a malfunction.

In addition to its capability of testing electronic units used in various external equipments, the automatic test equipment of the present invention is capable of performing tests on its internal components including the functional modules at the test station. For that purpose, an appropriate self-check program is selected from one of the stores at the computer station. Test instructions derived from that program result in the issuance of commands for configuring the functional modules, including the connecting of the module to be tested in the test system position normally occupied by the electronic unit under test. Under self-check conditions the functional module under test is either not required for testing itself or is automatically replaced in the test configuration by a spare functional module of like design. In this respect it will be appreciated that a wide variety of functional modules and substantial duplication are present in the stimulus and measurement sections of the test station to permit configuring and reconfiguring those sections in a variety of arrangements as is necessary to meet the exigencies of the units to be tested.

Figure 1:
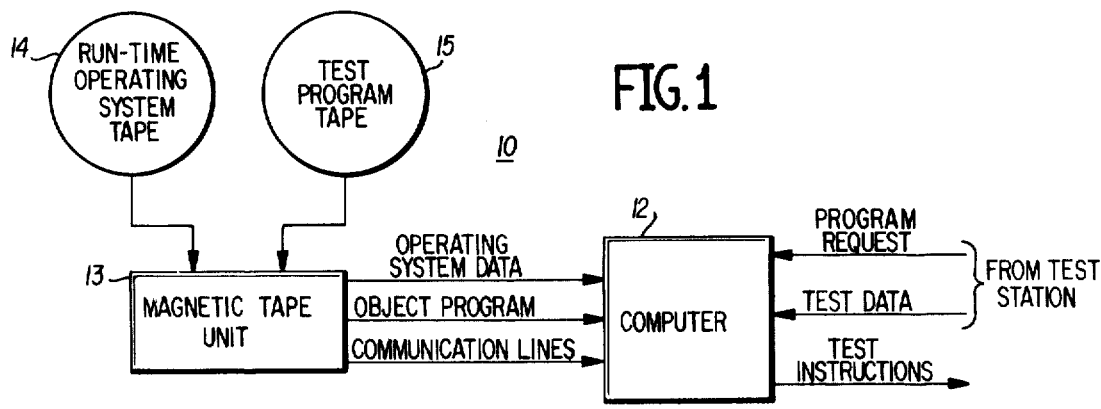
FIG. 1 is a simplified block diagram of the computer station.

DESCRIPTION OF THE PREFERRED EMBODIMENT:

Referring now to FIG. 1, at the computer station 10 (hereinafter sometimes referred to as the system computer) operating control for programmed testing is performed by a computer 12 of the general purpose type. Two-way communication between computer 12 and a magnetic tape unit 13 enables loading of an automatic test program to be used in testing several types of electronic equipment. The program is provided by a run-time operating system tape 14 and a test program tape 15 mounted in separate tape transports of the magnetic tape unit. Tape 14 contains subroutines necessary for the execution of the program specified by test program tape 15. Operating system data from run-time operating system tape 14 is used, for example, to provide logic and arithmetic operations, to provide appropriate display messages for system fault conditions, and to comply with operator interrupt requests upon demand. Still other information is provided by tape 14 when requested by instructions from test program tape 15. Each specific program stored on tape 15 contains sufficient information to set operating conditions for the test station (described below), to interrogate the test station with reference to a specific response, and to indicate the status of the test station and the unit under test.

Upon request from the test station for a test program for a particular unit under test (UUT), computer 12 directs magnetic tape unit 13 to load the appropriate object program (i.e., test program) into the computer memory. Upon completion of loading, test instructions are generated by the computer for control of the test station. Results of the tests performed by the test station on the UUT in accordance with the program are supplied to computer 12 for evaluation and display. It will be observed that the general structure and operation of computer station 10 is conventional and, except for certain specific details which will be described hereinafter, need not be further discussed.

Figure 2:
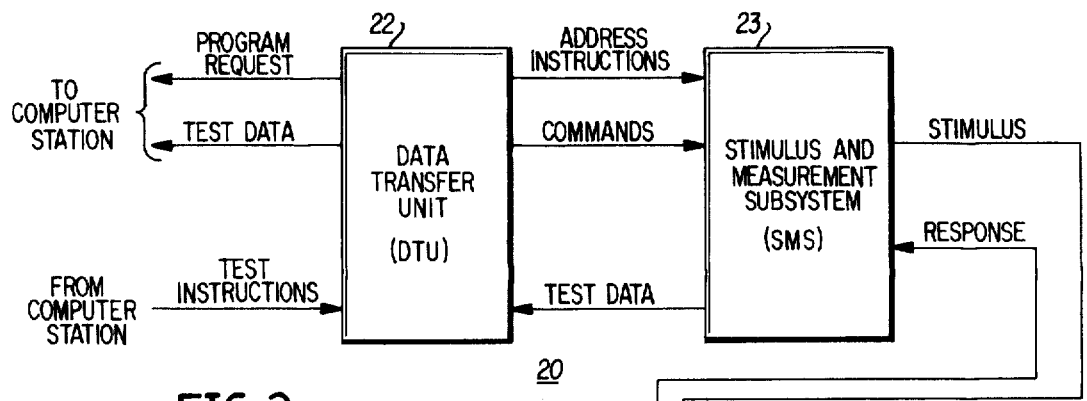
FIG. 2 is a simplified block diagram of the test station.

Referring now to FIG. 2, the test station 20 includes a data transfer unit 22 and a stimulus and measurement subsystem 23. The latter comprises a wide variety of building blocks designated BB1, BB2, BB3, . . . , BBn, which are adaptive to commands derived from the test instructions issued by the system computer for organization into a test configuration and mode as required for the performance of a test or tests on a specific UUT. In general, each building block has its own buffer control unit (BCU) which initially accepts commands from the data transfer unit (DTU) and through which the results of measurements performed by a building block are supplied to the data transfer unit. As previously stated, building blocks such as signal generators, oscillators, function generators, pulse generators, power supplies and the like are classified as sources and are part of the stimulus section of the stimulus and measurement subsystem (SMS). Building blocks such as digital multimeters, frequency meters, power meters, voltmeters, spectrum analyzers, oscilloscopes and the like are sensors, within the measurement section of the SMS. Some building blocks, such as feedback simulators, transformers, and other dissipative devices classified as loads, and those which perform connecting functions such as switches and relays, are used in both the stimulus and the measurement sections.

Test instructions received from computer station 10 are through-putted as address instructions and function and data commands by DTU 22 to SMS 23. At the SMS, the addressed building blocks are organized and respond to the commands to apply a specific stimulus, such as a signal of specified amplitude and frequency, a modulated carrier, a fixed voltage level, or other input, to a UUT 25, and to receive and measure the response of the UUT to each stimulus. The result of the measurement is reported back to the computer station via the DTU for analysis, usually a comparison of actual performance against a desired performance in terms of various criteria stored in the computer memory. If the test result (actual performance) agrees with or is within stored tolerances conforming to the expected value (desired performance) the computer station issues the next instruction to the test station to direct the use of another stimulus for checking another function of the UUT. The instructions may issue in a predetermined sequence irrespective of the results of any given test, or each test may be instituted on the basis of the result of the immediately preceeding test, depending upon the particular diagnostic function desired. Upon completion of the testing of all functions of the unit within satisfactory limits the unit is considered to be operational. In the event a test result is unsatisfactory, the computer program ceases and an instruction is issued for display (or readout) of an appropriate action to be undertaken by an operator at the test station. This may simply be the performing of an adjustment on the unit under test or may require the replacement of the unit or a component thereof when a malfunction or failure has been diagnosed. In some instances it is desirable thereafter to utilize only a faulty component of the unit under test as the unit under test itself. An applicable test program for that purpose is selectable at the computer station.

In addition to testing external electronics equipment the tester is capable of automatically testing itself as well as isolating defective modules in one or more building blocks of the test station in a self-check operation. It is desirable that the self-check or self-test procedure be performed periodically to ensure that the tester is operating properly and thus that tester results are reliable, i.e., that results indicating malfunction of the unit under test are indeed correct. In the event of improper response of the building block or assembly of the test station in the self-check procedure the suspected malfunctioning component is replaced and itself connected to the test station as the unit under test.

Figure 3:
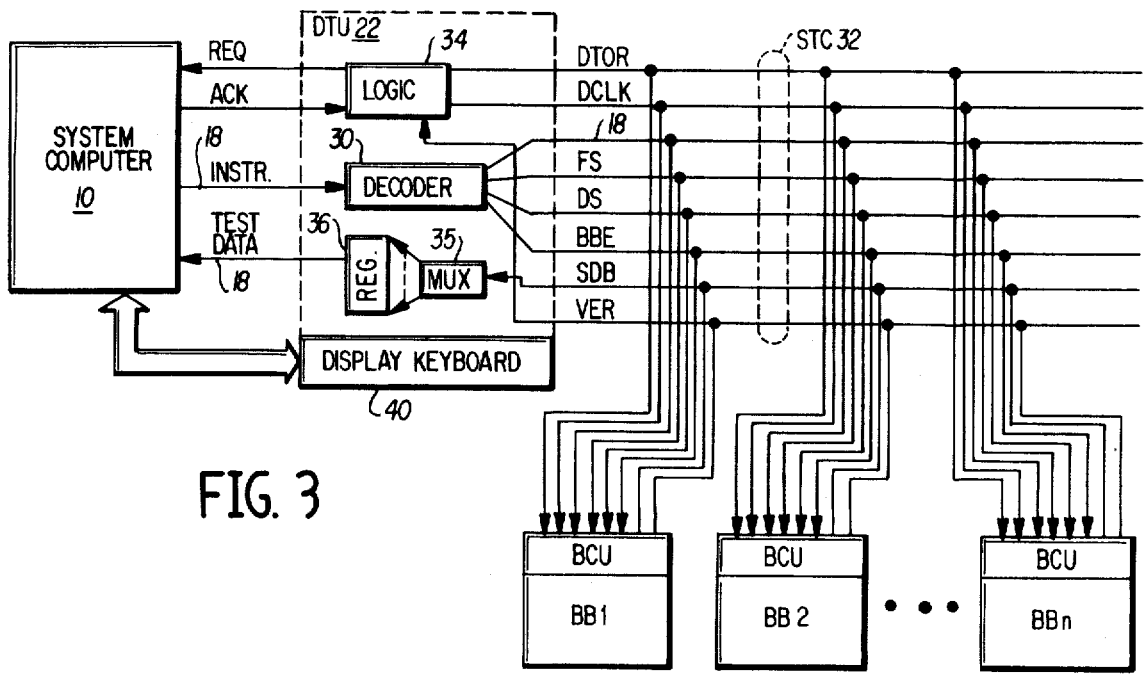
FIG. 3 is a more detailed block diagram of the test system showing the manner of transferring instructions and test results.

Referring now to FIG. 3, in initiating a test program, the DTU 22 requests instructions from the system computer 10. Upon receipt of the request (REQ) the computer acknowledges (ACK) and issues an eighteen bit instruction command under the control of the selected test program. Although many different formats are available, the preferred format at present is a hexadecimal word organization of the general type:

$$\underbrace{b^{17}b^{16}}_{\text{Identifying bits}} \quad \underbrace{b^{15}b^{14}b^{13}b^{12}}_{H_3} \quad \underbrace{b^{11}b^{10}b^9b^8}_{H_2} \quad \underbrace{b^7b^6b^5b^4}_{H_1} \quad \underbrace{b^3b^2b^1b^0}_{H_0}$$

A decoder 30 in the DTU 22 decodes each command and, using the identifying bits of the command, acts as a traffic manager for the transmission of the commands and various data from (and to) the system computer to (and from) the DTU itself, and the buffer control units (BCU's) and building blocks (BB's) of the SMS. These commands which the decoder detects as non-DTU commands are through-putted to the SMS and are implemented by either the BCU or the BB electronics, as required. Similarly, any data commands received from the SMS by the DTU are examined for identity codes and are retained by the DTU and/or are through-putted to the system computer accordingly.

The issuance of control words (instruction commands) and of test data (data commands) between the system computer and the SMS is achieved through the use of simple "hand shake", i.e., ready-resume, logic. That is to say, data transmission from the SMS is based on the proper receipt and recognition of each control word from the computer, to initiate a request for the next control word. This verification process establishes that the intended result of a command has actually occurred; for example, that a programmed output level has been achieved as verified by appropriate monitoring circuitry, or that phase lock has been attained for a programmed frequency. A consequence of the verification process is that the time delay for the next data request by the computer (i.e., request that the SMS transfer data) is shortest for DTU functions and increases through BCU functions to a maximum for BB functions.

Transmission between the DTU and the SMS is effected via a system trunk cable 32. Among the signals handled by the system trunk cable are the following. A building block enable (BBE) signal is issued by the DTU on the basis of the identifying bits in the control word (above). A BBE signal of one binary value, say 0, is indicative of a BCU function, whereas a BBE signal equal to 1 is indicative of a BB function, for example. A signal consisting of the sixteen data bits in the hexadecimal format of the control word is through-putted by the DTU to effect a particular test program operation, as will be illustrated presently by way of a specific example. Mutually exclusive function strobe (FS) and data strobe (DS) signals are generated by the DTU according to the type of command (function, i.e., test instruction, or data, i.e., test data) involved. A serial data clock (DCLK) signal is generated by the DTU in the form of shift pulses to shift data out of the BB's onto a serial data bus (SDB) for transfer to the computer via the DTU. A signal designated DTOR is generated by the DTU upon receipt by the DTU of a fault signal (i.e., an indication of a fault in the test data) from the system computer. The DTOR signal is directed to the BCU's to disable all outputs of BB's to the serial data bus (SDB). A verification (VER) signal is issued by the SMS (from either a BCU or a BB) to communicate to the DTU the execution/acceptance of an instruction/address in the SMS. The latter signal evokes a data transfer request from the DTU to the system computer.

Figure 4:
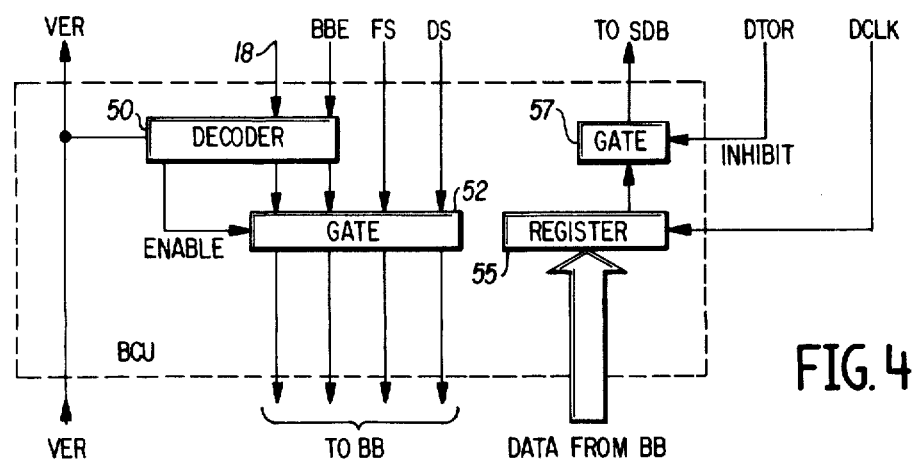
FIG. 4 is a generalized block diagram of a buffer control unit associated with building blocks of the test station.

A respective BCU is associated with each BB in the SMS. Each BCU is generally structured as shown in the functional block diagram of FIG. 4. The BBE signal and the control word data bits are applied to every BCU along the system cable trunk. The decoder 50 in the BCU which is addressed, however, recognizes the unique address for that BCU from the BBE signal and the data bits, and thereupon enables a gate 52 to thru-put the BBE, the data bits, the FS, and the DS signals to the associated BB. Hence, one and only one BCU is latched for any given control word and associated signals from the DTU. The other BCU's along the system trunk cable inhibit the entry of signals into their respective BB's. The particular BB which has been enabled then operates to perform the function required by the control word. The FS signal identifies a function command as forthcoming and the DS signal indicates that a data command follows. The BCU depicted in FIG. 4 is of generalized structure suitable for use with a building block in either the stimulus section or the measurement section of the SMS. The control words directed to BB's in the stimulus section produce desired interconnections of and outputs from the specified BB's for the provision of appropriate stimuli to the UUT, whereas control words for BB's in the measurement section designate interconnection of and measurements by those BB's which results in test data for entry into a control register 55 in the BCU. Data is shifted out of the register in accordance with the DCLK pulses and onto the SDB unless and associated gate 57 in the BCU is inhibited by the DTOR signal.

Returning again to FIG. 3, logic 34 in DTU 22 for issuing the object program request (in response to the request of a human operator) and for receiving acknowledgements, also responds to each VER signal on system trunk cable (STC) 32 to request a new instruction from system computer 10. In addition, logic 34 issues DTOR and DCLK signals. The BBE, FS, DS, and 18-bit address, function command, and data command signals are issued by decoder 30 in DTU 22 on the basis of the 18-bit instructions originally received from the computer. A multiplexer (MUX) 35 and register 36 receive and store data from the BB's on the serial data bus, for entry into the computer. A display keyboard 40 associated with DTU 22 has the same communication links with the computer as does the DTU, to permit accessing the computer and display of information therefrom, both in the normal sequence of events in which the status of a UUT is to be displayed and in unusual circumstances in which data in the computer memory is to be examined.

Figure 5:
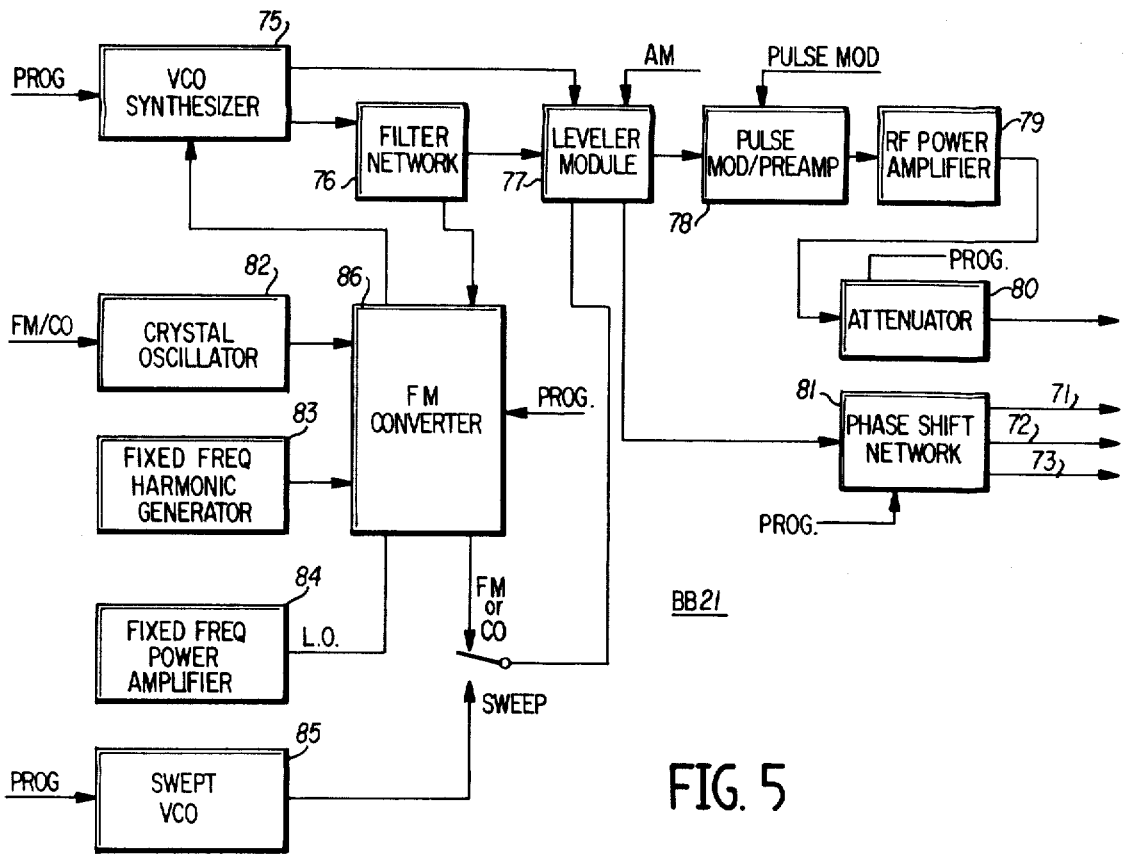
FIG. 5 is a block diagram of an exemplary building block.

Several different building blocks will now be described in detail as representative examples of those used in the SMS. Referring to FIG. 5, BB 21 is a signal generator capable of producing CW, AM, and PAM signals in the frequency range of 10 KHz to 40 MHz, and FM and swept signals in the frequency range of 1 MHz to 40 MHz. The signals are generated at power levels of +30 to −107 dbm at a main RF output 70. Three other outputs 71, 72, 73, one fixed in amplitude and the other two related in phase are also available. All programmable functions of BB 21, such as frequency, amplitude, and modulation, are specified by the control words emanating from the system computer via the DTU in accordance with the desired test program. As will be observed from FIG. 5, BB 21 contains a plurality of component units all of which are preferably individually replaceable so that the failure of any one component does not permanently impair the operativeness of the BB. The replaceable components in this example are VCO/synthesizer 75, filter network 76, leveler module 77, pulse modulator/preamplifier 78, RF power amplifier 79, attenuator 80, phase shift network 81, crystal oscillator 82, fixed frequency harmonic generator 83, fixed frequency power amplifier 84, swept VCO 85, and FM converter 86. Necessary power supplies generally designated by reference number 87, are also replaceable.

A multiplicity of programmable modes of operation of BB 21 are available, with each operational mode restricted to specific sections of the building block. In the continuous wave mode (CW), programmed commands determining carrier frequency and amplitude of the main RF output signal are fed to BB 21 via the associated BCU in the program statements of an object code in the hexadecimal format discussed above. An exemplary test program involving stimulus and measurement BB's for a specific UUT will be described hereinafter. For the purposes of the present description of sepcific building blocks, it is sufficient to note that any desired instruction, information or data to be used within the overall system may be implemented in the language of the particular object code selected, and hence specific code examples are not essential to an understanding of the invention for the moment. The VCO/synthesizer 75 responds to the program commands relating to carrier frequency to develop an appropriate signal frequency in the range from 10 MHz to 100 MHz. Decade dividers are used for developing signals below 10 MHz, whereas signals up to the 40 MHz range of BB 21 are developed directly by the VCO/synthesizer. Output of the latter within the 10 MHz to 40 MHz range is fed directly to leveler module 77, while the output below 10 MHz is first filtered by filter network 76 to reduce spurious harmonics attributable to division at the lower frequencies. The leveler module 77 uses amplifier circuits and automatic gain control to compensate for conversion loss of the various frequency bands of the signal, keeping the output amplitude constant across the entire frequency range. The leveler module output to be used for the main RF output of BB 21 is fed through pulse mod/preamp 78, which acts simply as a preamplifier for the signal in the CW mode, to power amplifier 79 where it is subjected to a predetermined gain. The amplified signal is supplied to programmable attenuator 80 whose transfer atteniation characteristic is controlled by another program command to selectively set the main RF output signal within the dynamic range of +30 to −107 dbm. The remaining output of the leveler module is applied to phase shift network 81 which is programmable to control the phase shift of one of the latter's outputs from 0° to 180° in suitable increments relative to a reference phase output. The fixed amplitude output 71 of the phase shift network is identical in frequency to the main RF output (and to the other two auxiliary outputs) and in in phase therewith but has its amplitude fixed at a preset level.

In the sine wave amplitude modulation (AM) operation mode of BB 21, the signal flow and the program command capabilities are identical to the CW mode except that an external sine wave is applied to leveler module 77, at the AM input 88 thereof, to provide the main RF output signal with an envelope having the same frequency as the input modulating signal.

In the pulse modulation (PM) mode, operation is again identical to that in the CW mode, except that here the RF carrier frequency is modulated by pulses applied to the PM input 90 of pulse modulator/preamplifier 78.

In the pulse amplitude modulation (PAM) operational mode of BB 21, the CW mode signal is subjected simultaneously to amplitude modulation and pulse modulation as in the AM and PM modes so that the main RF output signal possesses both of these characteristics.

The frequency modulation (FM) operational mode involves the application of a signal from programmable FM converter 86 to leveler module 77. An external modulating signal of constant amplitude and varying frequency is applied to crystal oscillator 82 as an input to FM converter 86 to provide the deviation rate of the main RF output signal. In particular, the FM converter mixes and filters its input signals to generate an output FM signal whose deviation rate is proportional to the input modulating signal and whose total frequency excursion is set by a program deviation input 91 to the converter. The output signal of the converter is fed directly to the leveler module and is thereafter processed in the same manner as in the CW mode.

A carrier offset (CO) mode is available when greater frequency resolution of the RF carrier output is desired than is available with purely programmable resolution. Operation is similar to that in the FM mode with the following exceptions. Fixed frequency harmonic generator 83 receives a 10 MHz reference signal from crystal oscillator 82 and supplies a reference signal to the FM converter 86 for additional use as a phase lock by VCO/synthesizer 75. The latter signal is also processed by fixed frequency power amplifier 84 for use by the FM converter as a local oscillator signal. The input modulating signal is effectively converted to a dc level which offsets the FM oscillator by an amount proportional to the input signal frequency.

In the sweep mode, the sweep rate of a swept VCO 85 is determined by program commands. The swept VCO also receives a local oscillator signal from the fixed frequency power amplifier. The output signal of the swept VCO is fed directly to the leveler module 77 and is thereafter processed as in the CW mode.

Building blocks of a type corresponding to BB 21 are available from PRD Electronics of Syosset, New York.

Figure 6:
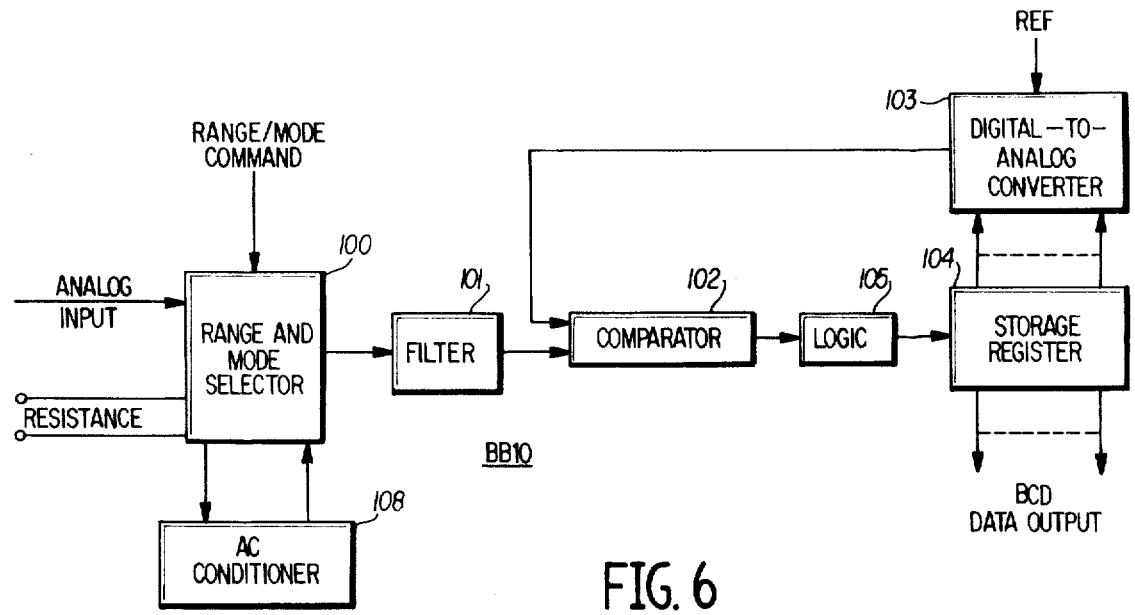
FIG. 6 is a block diagram of another building block.

Another building block example, designated BB 10 in FIG. 6, functions as a programmable digital multimeter for measurement of electrical resistance, and ac and dc voltages, with three ranges of operation in each mode. In the dc voltage mode of operation, a dc input voltage to be measured (derived from a UUT to which appropriate stimuli have been applied) is fed to a programmable range and mode selector 100. The selector includes an input amplifier whose gain or loss (attenuation) characteristic is programmable in accordance with commands from the system computer, to appropriately set the range to a desired maximum full scale level. In addition, the selector includes a programmable switch for mode selection by the program commands, which in this sepcific example select the dc voltage mode. The output signal of selector 100 is applied to a filter 101 which is programmable to select a desired low pass cut off frequency for the removal of unwanted ac on the dc signal to be measured. The filtered signal is applied to comparator 102 which compares the signal to the output of a digital-to-analog (D/A) converter 103. The converter, which may be a precision resistance ladder, is supplied with a selected reference voltage (dc when in the dc mode), whose magnitude depends on the full scale selection. This reference is combined with the level stored in a storage register 104 and converted to an analog value for application to comparator 102. If a difference greater than 100 microvolts exists between the output of filter 101 and the output of converter 103, the comparator generates an output which drives logic 105 5o produce count up or count down pulses (depending upon the polarity of the difference) to change the level (count) sotred in register 104 and thereby to achieve the desired null in comparator 102. If the difference between the two inputs to the comparator is within 100 microvolts (the desired null) for a predetermined time interval, the logic 105 locks in the value stored in register 104 as the measured value and that stored data is outputted to the associated BCU for application to the serial data bus in accordance with DCLK pulses issued by the DTU.

In the ac mode of operation of BB 10, the ac input signal is routed through the input selector switch of range and mode selector 100 to the input of an ac conditioner 108. The latter attenuates the ac signal by a preset ratio and subjects the attenuated signal to full wave rectification. The rectified signal is then applied to an input amplifier of range and mode selector 100 for processing in the same manner as for operation in the dc mode described above.

In the resistance mode, the unknown resistance is connected in circuit with a precision wire-wound resistor across an accurate source of reference voltage, upon connection of the unknown resistance to the resistance terminals of range and mode selector 100. Current flowing through the unknown resistance is fed back to an operational amplifier and the output of the amplifier is processed in the same manner as the dc mode.

Multimeters of a type corresponding to BB 10 are available from Cimron Division of Lear Siegler, Inc., Anaheim, Calif.

Figure 7A:
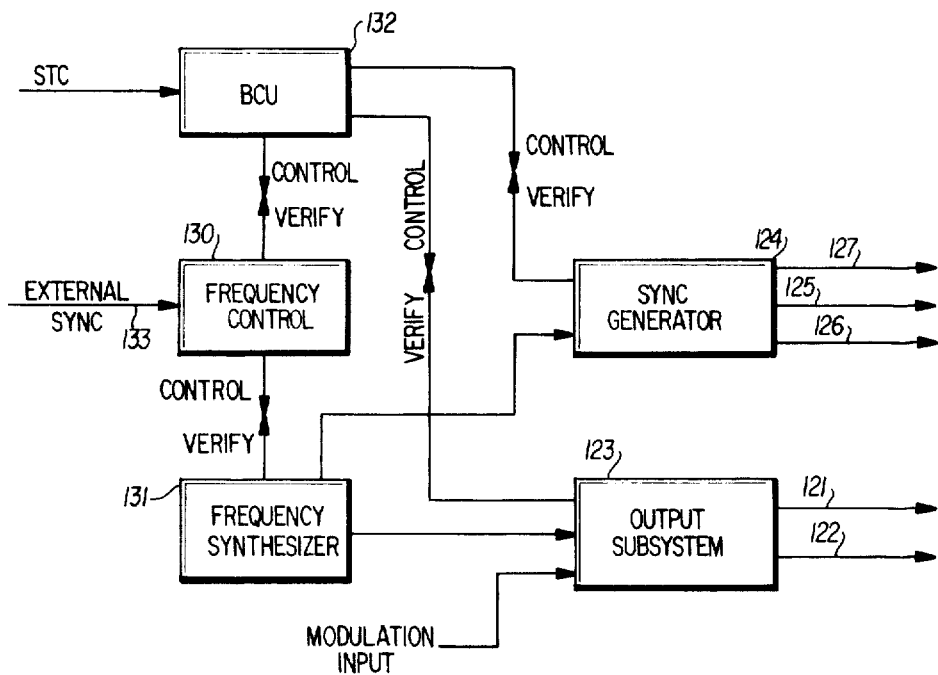
FIG. 7A and 7B are block diagrams of still another building block.

FIG. 7a is a functional block diagram of another building block, designated BB 20, constituting a digitally programmable low frequency signal generator. In particular, BB 20 is a source of low frequency sinusoidal signals, both modulated and continuous wave (cw), in the frequency range of 0.1 Hz to 50 KHz and an output amplitude range of 0 to 30 vrms. Two signal outputs 121, 122, individually programmable in amplitude but originating from the same frequency source, are derived from an output subsystem 123. The frequency of the output signal can be selected by programmed instructions or derived from an external sync input. Three synchronization outputs are also provided from a sync generator 124. One sync output, 125, occurs at 0° in reference to the signal output; a second, 126, occurs at 90° in reference to the signal output. The third sync output, 127, occurs at 0° but at a programmable sub-multiple, in reference to the signal output.

A frequency control unit 130 generates the necessary signals to control a frequency synthesizer 131. Two modes of frequency selection are available, programmed frequency in response to commands inputted via BCU 132, and external synchronization applied at input line 133. In the programmed frequency mode, the output frequency is determined by remote programming via the system trunk cable through the associated BCU. When operated in the externally synchronized mode, the output frquency is equal to one-fourth the repetition rate of an external sync input signal as a consequence of the receipt of four equally spaced sync pulses per one cycle of output frequency. Selection of each operation mode is controlled by the object program.

As previously described, the respective BCU 132 channels all communication between the system trunk cable (STC) and signal generator BB 20. Programmed instructions are received by the BCU, decoded, stored and used to control the various parameters of BB 20 such as the output frequency and output amplitude. Verify (VER) signals from other sections of the signal generator are collected by the BCU and applied to the SDB of the STC (see FIGS. 3 and 4, also) in response to appropriate requirements.

Sync generator 124 receives instructions from the BCU and timing signals from frequency synthesizer 131 and generates the sync outputs in response thereto. The frequency synthesizer generates a constant amplitude sine wave at a frequency determined by frequency control 130 and applies it as a cw signal of precise frequency to output subsystem 123. The frequency synthesizer also generates timing signals used in the sync generator. The output subsystem provides modulation, amplitude control and power driving for the two separate outputs of BB 20. The cw signal from the frequency synthesizer may be modulated by an external signal to provide outputs in the am mode or may be amplified and used as direct output in the cw mode. Mode and amplitude control is received from the BCU in accordance with program control words from the STC.

Figure 7B:
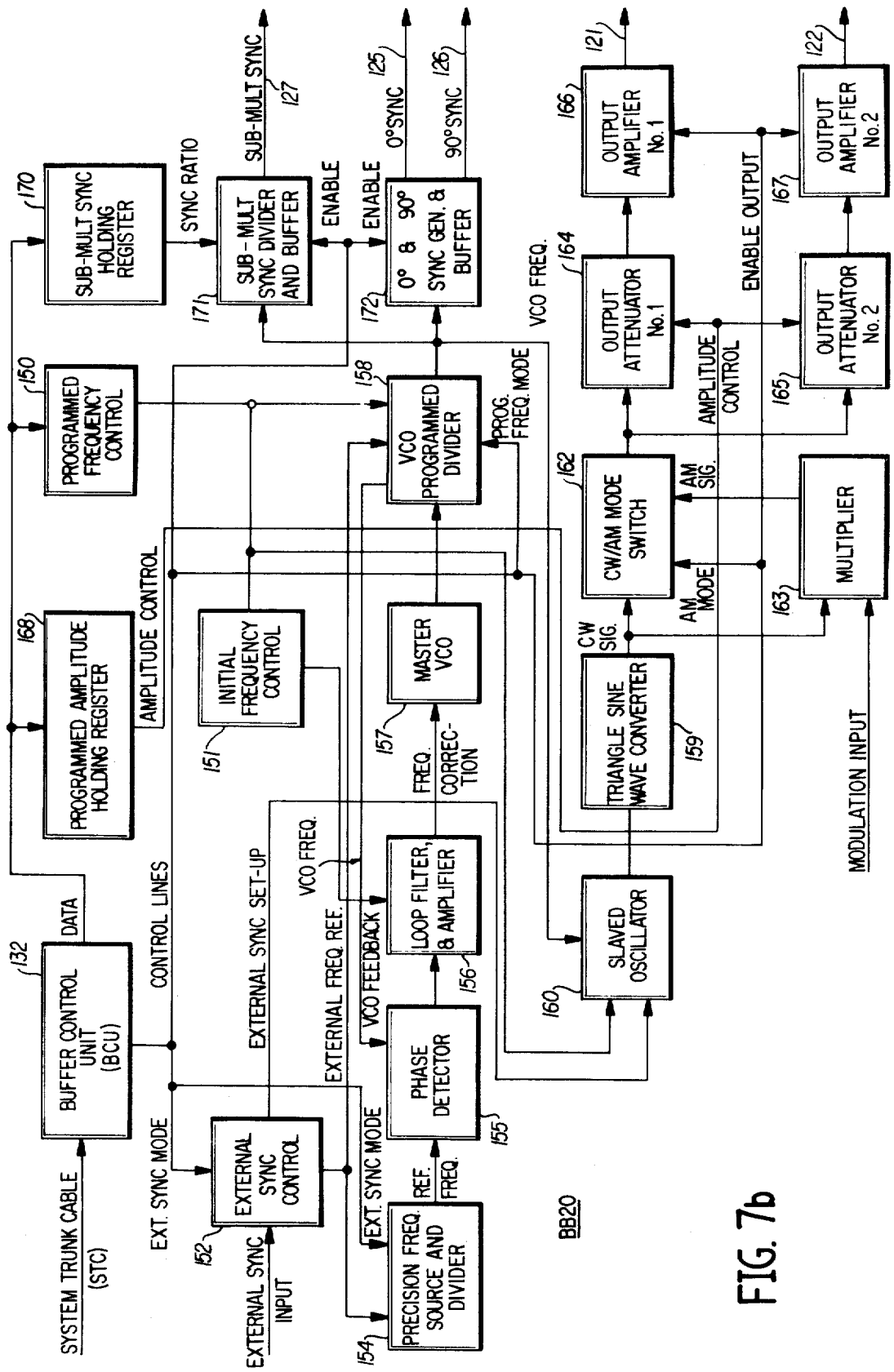

FIG. 7b is a detailed block diagram of low frequency signal generator BB 20. As previously discussed, BCU 132 contains the control logic necessary to transfer information between the system trunk cable and its associated building block, here BB 20. The BCU decoder (FIG. 4) includes logic circuitry for receiving, decoding, and transferring the address information and the four hexadecimal digits of each control word and the accompanying function strobe (or sync, FS) and data strobe (or sync, DS). VER signals from various components of BB 20 are collected and routed back to the BCU decoder.

The frequency control section 130 of BB 20 consists of a programmed frequency control 150, an initial frequency control 151, and an external sync control 152. Programmed frequency control 150 includes storage and control elements required to store the programmed frequency instructions in a code word format to be described presently. Upon receipt of a frequency precommand as part of an appropriately coded function command word, together with a proper data command indicating the selected freuqency range, binary coded decimal characters stored in an internal frequency holding register are logically processed to derive digitally frequency information used to control the frequency synthesizer 131. The initial frequency control 151 receives the digitally coded frequency information from programmed frequency control 150 and generates an analog input signal for setting a voltage controlled oscillator (VCO) within the frequency synthesizer to within a predetermined tolerance of the expected operating frequency. This eliminates harmonic locking and decreases acquisition time of the frequency synthesizer. External sync control 152 provides frequency information to the frequency synthesizer when the external sync mode is used rather than the programmed frequency mode.

The frequency synthesizer section 131 contains the electronics necessary to generate the precise cw frequency corresponding to the command frequency received from the initial frequency control 151, and to provide frequency data to the sync generator section 124. In particular, the synthesizer consists of a precision frequency source and divider 154, a phase detector 155, a loop filter and amplifier 156, a master VCO 157, a VCO programmed divider 158, a triangle-sine wave converter 159, and a slave oscillator 160. Precision frequency source 154 includes a stable crystal oscillator and a down counter (divider) to provide a 100 Hz logic reference signal to phase detector 155. The latter comprises logic circuitry for comparing the divided output of master VCO 157 from divider 158 with the reference frequency and for locking the VCO frequency to the reference. The phase lock loop for the VCO includes phase detector 155, loop filter 156, master VCO 157, and programmed divider 158. The loop filter combines the output of the phase detector with the frequency command from initial frequency control 151, filters and amplifies the combined signal, and supplies the resulting signal to the master VCO. The latter responds to the loop filter output to provide a corrected, linearly controlled frequency to programmed divider 158. The three most significant digits of the programmed frequency value obtained from BCU 132 are used to divide the output frequency of the VCO to provide a desired frequency (100 Hz, in this example), which is compared with the reference frequency in phase detector 155. Programmed divider 158 also divides the VCO frequency by a number derived from the programmed input to supply a signal of desired frequency and having the stability of the precision frequency source 154 to slave oscillator 160 and to sync generator 124. Slave oscillator 160 receives inputs from the programmed divider 158 and the frequency control 150 and, by switching opposite polarity current sources into an integrator, produces a triangular wave with the same frequency as the input. The internal circuitry adjusts the currents and integrator constant to produce constant peak-to-peak amplitude. Triangle-sine wave converter 159 receives the constant amplitude triangular wave output of the slave oscillator and shapes it into a high quality sine wave for application to output subsystem 123.

The output subsystem performs the functions of modulation, amplitude control, and power driving capability in either a continuous wave mode or a modulated mode. The signal obtained from the frequency synthesizer section 131 can be modulated by an external modulating signal input which results in a double sideband - suppressed carrier modulation of the output. The amplitudes of the two separate signal outputs 121, 122 are controlled by using programmable attenuators. Output amplifiers provide the appropriate voltage and power levels. The BCU decoder provides the correct digital commands to accomplish the programming. Specifically, output subsystem 123 consists of cw/AM mode switch 162, multiplier 163, output attenuators 164, 165, output amplifiers 166, 167, and amplitude holding register 168. Normal operation is in the cw mode, with AM mode selection of switch 162 accomplished by program control from the BCU decoder. In the cw mode, the sine wave output of converter 159 is connected directly to the input of programmable attenuators 164, 165. In the modulated mode, the output of the multiplier 163, which is the algebraic product of the sine wave signal from the converter and the modulation input is applied directly to the input of the attenuators. An amplitude holding register 168 contains the necessary storage and control logic to receive the programmed output amplitude from the BCU decoder and to drive the programmable attenuators. A verify response is generated by the amplitude holding register after a feedback is received from the programmable attenuator. Attenuators 164, 165 are identical and each is separately programmable by the command from the amplitude holding register. The range of the attenuators is from a relative value of 000 to 300 in steps of 1. A respective linear output amplifier 166, 167 is driven by each of the programmable attenuators. The amplifiers are capable of providing 30.0 volt RMS output across 50 ohms, or greater; adequate power capacity to operate into a load of 100 ohms minimum is also provided. The operating voltages of the attenuators can vary the signal outputs 121, 122 of BB 20 from 0.0 to 30.0 in 0.1 steps.

Sync generator 124 receives timing signals from the frequency synthesizer and generates three sync outputs. The first sync output 125 occurs concurrently with the 0° point of each cycle of output. The second sync output 126 occurs concurrently with the 90° point of each cycle of output. The third sync output 127 occurs at a sub-multiple of the output signal. The sub-multiple ratio is programmable over the range from 1 to 999, in integer steps. Sync generator 124 consists of a sub-multiple sync holding register 170, a sub-multiple sync divider and buffer 171, and a sync generator and buffer 172. The sub-multiple sync holding register 170 contains the necessary storage and control elements to store the programmed ratio between the output frequency and subharmonic sync output repetition rate. Data transfer to the holding register is accomplished by the BCU decoder and the outputs of the register are used to determine the countdown ratio of the sub-multiple sync divider and buffer 171. The latter contains counting and control logic to accept a signal from VCO programmed divider 158 at the output frequency, count it down by the programmed ratio supplied by register 170 and generate a sub-multiple sync output. The programmed ratio may range from 1 to 999. Three decade counters, with feedback controlled by holding register 170, are used to count down the output repetition rate. Application of the sub-multiple sync pulses to the output line 127 is under program control. The 0° and 90° sync generator 172 receives an input from the frequency synthesizer section 131 and generates sync pulses at 0° and 90° relative to that input. Application of the sync pulses to the output lines 125, 126 is under program control.

Low frequency signal generators of a type corresponding to BB 20 are also available from PRD Electronics, Inc., Syosset, Long Island, N.Y. In addition, PRD Electronics, which is the assignee of the instant application and of the invention covered by this application, is a source of a multiplicity of other stimulus, measurement, interface (and switching), and miscellaneous building blocks. These include digital word generators, delay generators, signal generators, function generators, pulse generators, and power supplies as stimulus building blocks; digital multimeters, frequency and time interval meters, phase sensitive voltmeters, impedance meters, low frequency wave analyzers, spectrum analyzers, peak power meters, RMS voltmeters, noise figure meters, average power meters, and digital readout oscilloscopes as measurement (response) building blocks; and RF amplifiers, feedback simulators, servo analyzers, synchro/resolvers, radio transformers, and resistive loads as miscellaneous building blocks; each of which is programmable for organization and execution of test programs in accordance with instruction and control words issued by the system computer.

The object code used to control the functions (e.g., measure) and settings (e.g., range selection) of the building blocks and to transfer data from the building blocks to the DTU is a sequence of 18-bit words coded in the hexadecimal format exemplified earlier herein and containing all of the information and programming language existing in the particular computer language employed. As previously observed, the building blocks to be used in a particular test program are addressed and set up one at a time through the procedure of latching the associated BCU, and then applying function commands (test function of the BB) and data commands (test parameters), all in the object code format.

In general, in the sequence of control words of the object code to be inputted to the building blocks, up to six bits of the first word are used for the building block address and up to three additional bits designate the subaddress for a specific component within the building block to which particular function commands (FC's) and data commands (DC's) are forthcoming. The remainder of the first word or the second word may indicate the number and type of FC's and DC's which follow. The next word and as many succeeding words or portions thereof as are necessary contain the function commands and associated data commands.

In a specific example of the code word format to follow, the first word of the object code for a test program constitutes the building block call word (i.e., the identification of the building block and of a specific component thereof, if any, which is to be controlled). The next word in the sequence consists of bit patterns indicating which FC's are to be issued. Each bit position of this word corresponds to one FC and its associated DC's. If a bit is a 1, the related FC is performed, but if the bit is a 0 the routine is omitted. Each word is scanned bit-by-bit starting with bit number 17 and proceeding to bit number 0.

Each building block has a function repertoire and any instruction (command) issued for performance by a BB must be in its repertoire. Preferably, each BB has its own unique sequence of FC's associated with the bit pattern of the code word. In many BB's the FC repertoire consists of more than eighteen functions, thus necessitating the use of more than one code word for FC's. For the sake of a specific example, however, assume that a particular building block has a repertoire of 18 functions and that for the FC code word associated with this particular BB:

bit 17 corresponds to a routine FC1000
bit 16 corresponds to a routine FC2000
bit 15 corresponds to a routine FC5003

. . . .

. . . .

bit 1 corresponds to a routine FC6000
bit 0 corresponds to a routine FC8001

Thus, an FC code word of 500001 (in octal) indicates for the building block of this particular example that FC's 1000, 5003, and 8001, together with associated DC's, if any, are to be performed.

The object code following the function command code word(s) contains the numerical information required to implement data commands associated with each of the FC's referenced by the FC code word(s). DC's may have any desired one of a variety of different formats within the basic framework of the 18-bit code word of the object code. The purpose of each DC is generally to assign a specific numerical value, as by inclusion of a floating point number, to the associated function requested.

The decoding sequence for each code word on the system trunk cable as performed by the decoder in each BCU is as follows:

a. identify building block addressed;

b. examine function command code word for the addressed BB, one bit at a time;

c. perform operation associated with the bit being examined to control the function and to select the associated data for that function within the BB;

d. repeat step (c) for each bit. During decoding, in response to VER signals from the BCU, the appropriate string of commands is issued in hexadecimal form by the system computer to the building block via the DTU and the BCU.

A typical set of command assignments for BB 20 (a 0.1 Hz – 50 Hz signal generator, described above) and for BB 10 (a digital multimeter, also described above) is set forth in Tables 1 and 2 respectively.

TABLE 1

BB 20 COMMAND ASSIGNMENTS

COMMAND  FUNCTION
FC-1XXX
   Open all Front Panel Connectors and Self-Check Bus
FC-5XX0
   Frequency Precommand
DC-0H$_2$H$_1$H$_0$
   H$_2$=BCD Representation of 10$^1$ Hz digit
   H$_1$=BCD Representation of 10$^0$ Hz digit
   H$_0$=BCD Representation of 10$^{-1}$ Hz digit
DC-1H$_2$H$_1$H$_0$
   H$_2$=BCD Representation of 10$^4$ Hz digit
   H$_1$=BCD Representation of 10$^3$ Hz digit
   H$_0$=BCD Representation of 10$^2$ Hz digit
FC-5XX1
   Amplitude, Modulation, Sync & Sub-Multiple Precommand
DC-0H$_2$H$_1$H$_0$
   Amplitude, Output No. 1
   H$_2$=BCD Representation of 10$^1$ Volts RMS digit
   H$_1$=BCD Representation of 10$^0$ Volts RMS digit
   H$_0$=BCD Representation of 10$^{-1}$ Volts RMS digit
DC-1H$_2$H$_1$H$_0$
   Sub-Multiple Sync Output
   H$_2$=BCD Representation of 10$^2$ digit of sub-multiple
   H$_1$=BCD Representation of 10$^1$ digit of sub-multiple
   H$_0$=BCD Representation of 10$^0$ digit of sub-multiple
DC-20H$_1$H$_0$
   H$_1$=0 No Modulation
   H$_1$=1 Modulation
   H$_0$=0 No External Sync
   H$_0$=1 External Sync
DC-4H$_2$H$_1$H$_0$
   Amplitude, Output No. 2
   H$_2$=BCD Representation of 10$^1$ Volts RMS digit
   H$_1$=BCD Representation of 10$^0$ Volts RMS digit
   H$_0$=BCD Representation of 10$^{-1}$ Volts RMS digit
FC-2XX0
   Apply RF Output No. 1
FC-2XX1
   Apply RF Output No. 2
FC-2XX2
   Apply Sync Output 0°
FC-2XX3
   Apply Sync Output 90°
FC-2XX4
   Apply Sub-Harmonic Sunc Output
FC-6XX0
   Open RF Output No. 1 Relay
FC-6XX1
   Open RF Output No. 2 Relay
FC-6XX2
   Open Sync Output –0° Relay
FC-6XX3
   Open Sync Output –90° Relay
FC-6XX4
   Open Sub-Harmonic Sync Output Relay
FC-6XX5
   Open Modulation Input Relay
FC-6XX6
   Close Modulation Input Relay
FC-6XX7
   Open External Sync Relay
FC-6XX8
   Close External Sync Input Relay
FC-8XX0
   Enable Self-Check Bus
FC-8XX1
   Disable Self-Check Bus
NOTES:
1. FC commands correspond to data transmission with an FS signal.
2. DC commands correspond to data transmission with a DS signal.
3. The X term in the command is not used and therefore does not have to be decoded.

TABLE 2

BB 10 COMMAND ASSIGNMENTS

COMMAND  FUNCTION
FC-1XXX
   Open all Front Panel Connectors and Self-Check Bus
FC-6XXX
   Close Main Signal Input
FC-3XXX
   Measure Parameter
FC-5XXX
   Mode and Range Precommand
DC-000H$_0$
   H$_0$=3 Set to Range 3
      0 to ± 999.99 volts DC or AC
      0 to 9.9999 Megohms
      0 to 99.999 ratio
   H$_0$=2 Set to Range 2
      0 to ± 99.999 volts DC or AC
      0 to 99.999 Kilohms
      0 to 9.9999 ratio
   H$_0$=1 Set to Range 1
      0 to ± 9.9999 volts DC or AC
      0 to 999.99 ohms
      0 to 0.99999 ratio
DC-100H$_0$
   H$_0$=3 Set to Filter 4
      AC frequencies to 10 Hz to 50 Hz
      Settling Time = 12 seconds
   H$_0$=2 Set to Filter 3
      AC frequencies to 50 Hz to 400 Hz
      Settling Time = 2.5 seconds
   H$_0$=1 Set to Filter 2
      AC frequencies of 400 Hz to 10 KHz
      Settling Time = 600 milliseconds
   H$_0$=0 Set to Filter 1
      All pass
      Settling Time = 65 milliseconds
DC-200H$_0$
   H$_0$=3 Set to Ohms Function
   H$_0$=2 Set to Ratio Function
   H$_0$=1 Set to AC Function
   H$_0$=0 Set to DC function
FC-7XXX
   Internal Self-Check Precommand
DC-0H$_2$H$_1$H$_0$
   H$_2$ H$_1$ H$_0$ = 800 Set to Measure Internal 0 volts DC
   H$_2$ H$_1$ H$_0$ = 811 Set to Measure Internal 0 volts AC
   H$_2$ H$_1$ H$_0$ = 900 Set to Measure Internal 7.775 volts DC
   H$_2$ H$_1$ H$_0$ = A00 Set to Measure Internal 8.885 volts DC
   H$_2$ H$_1$ H$_0$ = B11 Set to Measure Internal 1 volt AC
   H$_2$ H$_1$ H$_0$ = C11 Set to Measure Internal 5 volts AC
   H$_2$ H$_1$ H$_0$ = D03 Set to Measure Internal 100 ohms
   H$_2$ H$_1$ H$_0$ = E13 Set to Measure Internal 12 Kilohms
   H$_2$ H$_1$ H$_0$ = F23 Set to Measure Internal 294 Kilohms
FC-8XX0
   Enable Self-Check Bus (Connect Self-Check Bus to Input)
FC-8XX1
   Disable Self-Check Bus (Disconnect Self-Check Bus from Input)
FC-9XXX
   Disable External Measurement Function, Open External Measurement Relay & Enable Internal Measurement Function
FC-AXXX
   Enable External Measurement Function, Close External Measurement Relay & Disable Internal Measurement Function.

A typical object code format indicative of FC assignments for bit positions in the FC word(s) is illustrated in Tables 3 and 4, below, for BB 20 and BB 10, respectively.

TABLE 3

BB 20 FC WORD FORMAT

| FC Word No. | Bit Position | FC | No. of Object Prog. Data Words | Operations |
|---|---|---|---|---|
| 1 | 17 | 1000 | 0 | |
| 1 | 16 | 8001 | 0 | |
| 1 | 15 | 6000 | 0 | |
| 1 | 14 | 6001 | 0 | |
| 1 | 13 | 6002 | 0 | |

| | | | |
|---|---|---|---|
| 1 | 12 | 6003 | 0 |
| 1 | 11 | 6004 | 0 |
| 1 | 10 | 6005 | 0 |
| 1 | 9 | 6007 | 0 |
| 1 | 8 | 5001 | 7 |
| 1 | 7 | 5000 | 2 |
| 1 | 6 | 2000 | 0 |
| 1 | 5 | 2001 | 0 |
| 1 | 4 | 2002 | 0 |
| 1 | 3 | 2003 | 0 |
| 1 | 2 | 2004 | 0 |
| 1 | 1 | 6006 | 0 |
| 1 | 0 | 6008 | 0 |
| 2 | 17 | 8000 | 0 |

Operations (continued):
- Pick up floating point; evaluate, generate one DC.
- Pick up floating point; evaluate, generate one DC.
- Issue one DC exactly as set.
- Pick up floating point; evaluate, generate one DC.
- Pick up floating point; evaluate, generate two DC's.

TABLE 4
BB 10 FC WORD FORMAT

| FC Word No. | Bit Position | FC | No. of Object Prog. Data Words | Operations |
|---|---|---|---|---|
| 1 | 17 | 1000 | 0 | |
| 1 | 16 | 8001 | 0 | |
| 1 | 15 | 5000 | 5 | Pick up one floating point; evaluate, generate one DC (AC/DC Range). Issue one DC exactly as set |
| 1 | 14 | 5000 | 5 | Pick up one floating point; evaulate, generate one DC (OHMS Range). Issue one DC exactly as set. |
| 1 | 13 | 5000 | 5 | Pick up one floating point; evaluate, generate one DC (Ratio Range). Issue one DC exactly as set. |
| 1 | 12 | A000 | 0 | |
| 1 | 11 | 9000 | 0 | |
| 1 | 10 | 7000 | 1 | Issue one DC exactly as set. |
| 1 | 9 | 8000 | 0 | |
| 1 | 8 | 3000 | 0 | |
| 1 | 7 | 6000 | 0 | |

Using these command assignments and FC code word bit position assignments for BB 20 and BB 10, an example of system operation in which a simple sequence of application of a test signal to an amplifier under test, and measurement of the resultant output will now be described. The program statements for this test program are:

APPLY, BB20-1, 0.1V, 1KHz, CNX, H1 J1-C, L0 J1-G $

MEASURE, BB-10, MAX 10V, 1KHz, CNX, H1 J1-A, L0 J1-A $

These program statements designate the functions (i.e., routines) to be performed by the specific building blocks, the amplitude and frequency of the signal to be generated, the amplitude scale and frequency of the signal to be measured, and the various connections to be performed (or output and input terminals to which these signals are referenced). The object code function command code words corresponding to the above program statements are:

$$\text{BB 20 (1)} \quad \overline{\underset{101}{5}} \quad \overline{\underset{111}{7}} \quad \overline{\underset{111}{7}} \quad \overline{\underset{111}{7}} \quad \overline{\underset{100}{4}} \quad \overline{\underset{000}{0}}$$

Bit No. 17                                                                 0

$$(2) \quad \overline{\underset{000}{0}}$$

$$\text{BB 10 (1)} \quad \overline{\underset{101}{5}} \quad \overline{\underset{000}{0}} \quad \overline{\underset{000}{0}} \quad \overline{\underset{010}{2}} \quad \overline{\underset{000}{0}} \quad \overline{\underset{000}{0}}$$

$$(2) \quad \overline{\underset{000}{0}} \quad \overline{\underset{000}{0}} \quad \overline{\underset{000}{0}} \quad \overline{\underset{100}{4}} \quad \overline{\underset{000}{0}} \quad \overline{\underset{000}{0}}$$

The following tabulation identifies the sequence of operations performed by the building blocks in accordance with commands issued in the earlier-described hexadecimal format.

BB 20 Set up and connection to amplifier input

| Bit | FS | DS | BBE | Command In Hex | Routine |
|---|---|---|---|---|---|
| 17 | 1 | 0 | 0 | A020 | Address BB 20 |
| 17 | 1 | 0 | 1 | 1000 | Clear |
| 15 | 1 | 0 | 1 | 6000 | |
| 14 | 1 | 0 | 1 | 6001 | |
| 13 | 1 | 0 | 1 | 6002 | Open All Signal outputs and inputs |
| 12 | 1 | 0 | 1 | 6003 | |
| 11 | 1 | 0 | 1 | 6004 | |
| 10 | 1 | 0 | 1 | 6005 | |
| 9 | 1 | 0 | 1 | 6007 | |
| 8 | 1 | 0 | 1 | 5001 | Amplitude, modulation & sub-mult. Precommand |
| | 0 | 1 | 1 | 0001 | Set amplitude No. 1 Output=0.1 V. |
| | 0 | 1 | 1 | 1000 | No sub-multiple sync |
| | 0 | 1 | 1 | 2000 | No modulation, no ext. sync |
| | 0 | 1 | 1 | 4000 | Set amplitude No. 2 Output=0 |
| 7 | 1 | 0 | 1 | 5000 | Frequency precommand |
| | 0 | 1 | 1 | 0000 | Tens Units and tenths=0 (1 KHz. |
| | 0 | 1 | 1 | 2010 | Thousands=1 for 1 KHz |
| 6 | 1 | 0 | 1 | 2000 | Close output No. 1 |

(NOTE: Separate object code words are used to address and control a building block constituting an interface and configuration switch, or relay tree, to produce connection to amplifier for each of BB 20 and BB 10.)

BB 10 Set up and connection to amplifier output

| Bit | FS | DS | BBE | Command In Hex | Routine |
|---|---|---|---|---|---|
| 17 | 1 | 0 | 0 | A010 | Address BB 10 |
| 17 | 1 | 0 | 1 | 1000 | Clear |
| 15 | 1 | 0 | 1 | 5000 | Mode and range precommand |
| | 0 | 1 | 1 | 0001 | Set Range 1=10 V Max. |
| | 0 | 1 | 1 | 1001 | Set filter for 400 Hz to 10 KHz |
| | 0 | 1 | 1 | 2001 | Set to AC function |
| 7 | 1 | 0 | 1 | 6000 | Close main signal input |

BB 10 Measure sequence

| Bit | FS | DS | BBE | Command In Hex | Routine |
|---|---|---|---|---|---|
| 8 | 1 | 0 | 1 | 3000 | Measure voltage |

Figure 8:
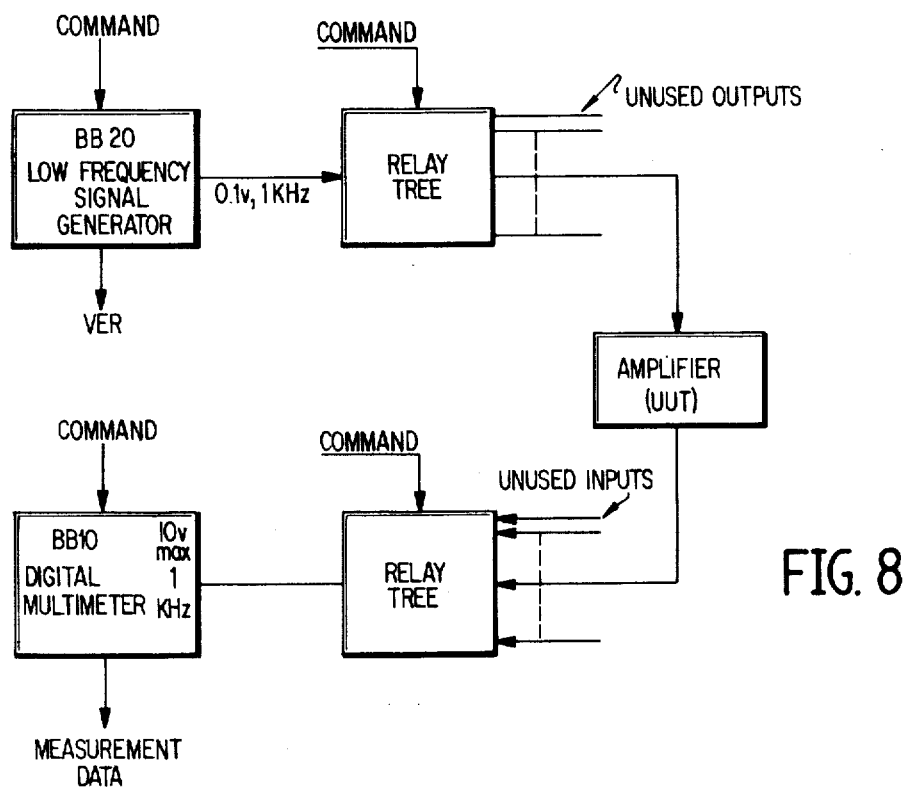
FIG. 8 is a block diagram of a configuration of building blocks for performing a test.

FIG. 8 shows the configuration of building blocks and unit under test (amplifier) implemented by these commands. BB 20 generates a 0.1V, 1 KHz signal which is applied to an interface switch, through which the output terminals of BB 20 are connected to the input terminals of the amplifier (UUT), is amplified, and is fed through a second interface switch to BB 10 for measurement in the selected range and mode.

Figure 9:
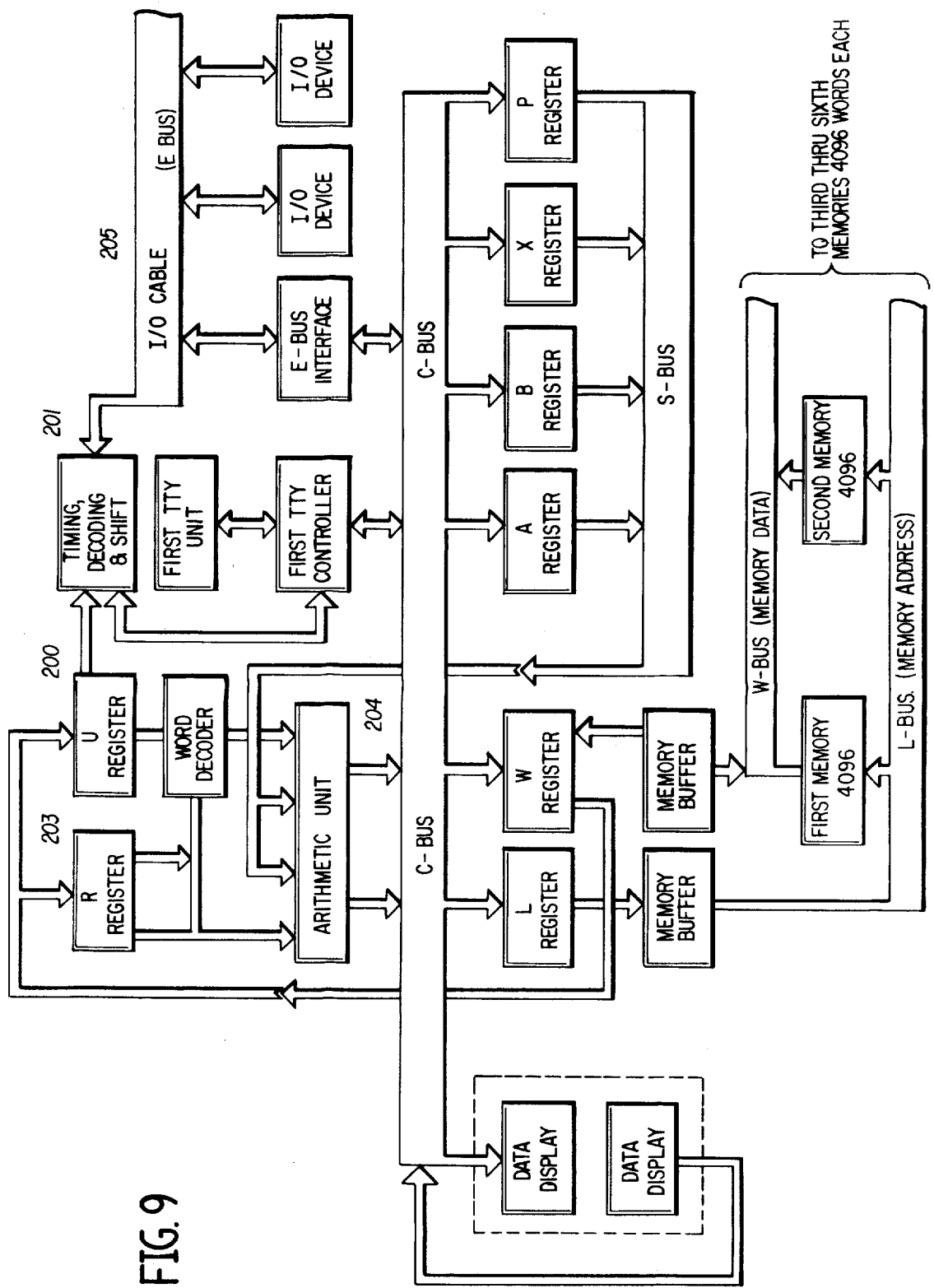
FIG. 9 is a diagram of the internal organization of a computer used at the computer station.

The system computer comprises a Varian R622/i computer (Varian Data Machines, Irvine, Calif.), Ampex ATM13-II magnetic tape transport units for the program and operating system tapes, and an ASR-35 teletypewriter (Teletype Corpoation) input/output console (may be located at DTU) using standard ASCII transmit-receive keyboard. The internal organization of the computer is shown in FIG. 9. In general, the computer consists of six basic sections, namely, a control section, an arithmetic/logic section, operational registers, internal buses, input/output bus, and memory.

The control section provides the timing and control signals required to perform all computer operations. It includes as its major elements a U-register 200, and timing and decoding logic and shift control, designated 201. U-register 200 is a 16-bit instruction register which receives each instruction from memory and holds it during its execution. Appropriate bits of the instruction words are routed to the timing and decoding logic where the decoding process provides the required timing and control signals. The address portion of the instruction word, which is used for various addressing operations, is routed to the arithmetic/logic section. The timing logic generates a basic 4.4 MHz system clock from which timing pulses are developed to sequence all operations within the computer. The decoding logic decodes applicable portions of the instruction word to deterimine the control signal levels required to perform the operations specified by the instruction. These levels select appropriate timing signals generated by the timing logic. The shift control contains a shift counter and logic to control operations performed by the shift, multiply, and divide instructions.

The arithmetic/logic section comprises two major elements, viz., and an arithmetic unit 204. R-register an R-register 203/receives operands from memory and holds them during instruction execution. It also permits transfers between memory and the input/output (I/O) bus 205 during the execution of extended-cycle instructions. The arithmetic unit contains the gating required for all arithmetic, logic and shifting operations performed by the computer. In addition, the arithmetic unit controls the gating of words from the operational registers and the I/O bus to other operational registers or to memory registers.

The computer contains a plurality of operational and auxiliary registers. The operational registers are those designated as the A-, B-, X-, and P- registers in FIG. 9. The A register is a full-length register constituting the upper half of the accumulator. It accumulates the results of logical and addition/subtraction operations, the most significant half of the double-length product in multiplication, and the quotient in division. The A register may also be used for input/output transfers under program control. The B-, X-, and P- registers are also full-length registers. The B register constitutes the lower half of the accumulator, for accumulation of the least-significant half of the double-length product in multiplication and the quotient in division. It may also be used for input/output transfers under program control and as a second hardware index register. The X register permits indexing operand addresses without adding time to the execution of indexed instructions. The P register holds the address of the current instruction and is accessed. Auxiliary registers U and R have been discussed above. The other auxiliary registers, L and W, are a 16-bit register which holds the memory location and an 18-bit (full-length) register which holds the memory word, respectively.

The computer contains internal buses designated C, S, W, and L, and an I/O bus. The C-bus provides parallel paths and selection logic for routing data between the arithmetic unit, the I/O bus, the operational registers and the L- and W- memory registers. The C-bus also feeds the computer display indicators, and facilitates simultaneous distribution of data to multiple operational registers. The S-bus provides parallel paths and selection logic for routing data from the operational registers to the arithmetic unit. The W-bus directly connects all memory modules to the memory word (W) register; it is a bidirectional bus which is time-shared among memory modules. The L-bus directly connects the memory address (L) register to all memory modules; it is also bidirectional.

The I/O bus 205 is a bidirectional line which permits programmed data transfers between the computer, the DTU, and other peripheral devices such as the teletypewriter.

The memory capability of the computer is 24,576 words. The computer and its main frame assembly contains 8,192 words and two memory expansion assemblies hold a total of 16,384 words. Instruction words read from memory are transferred to the control section for execution. Words may be transferred, under program control, from memory to the arithmetic/logic section, to the operational registers, or to the I/O bus.

A direct memory access capability allows data to be transferred into or out of memory modules without disturbing the contents of the operational registers. Only the contents of the L and W registers are changed. This type of access is on a so-called "cycle-steal" basis, in which normal programmed execution of instructions is frozen for one full cycle to allow word transfers into and out of memory. Buffer interlace controllers are used to programmably implement the cycle steal operation. The program resumes normal processing at the start of the next instruction cycle.

The DTU, described hereinabove, is the primary communication element in the operator-system computer-SMS-UUT interface. Using an I/O console consisting of a PD111 ASR-35 keyboard (Teletype Corporation) for standard ASCII transmission and reception of data, a paper tape punch and reader, and power control and indicators, an operator may exercise supervisory or direct control of the test program, monitor station performance, and select modes of operation. In essence, the DTU monitors, controls, and synchronizes instructions from the computer and data to the computer, and thus directs the organization and function of the building blocks.

Figure 10:
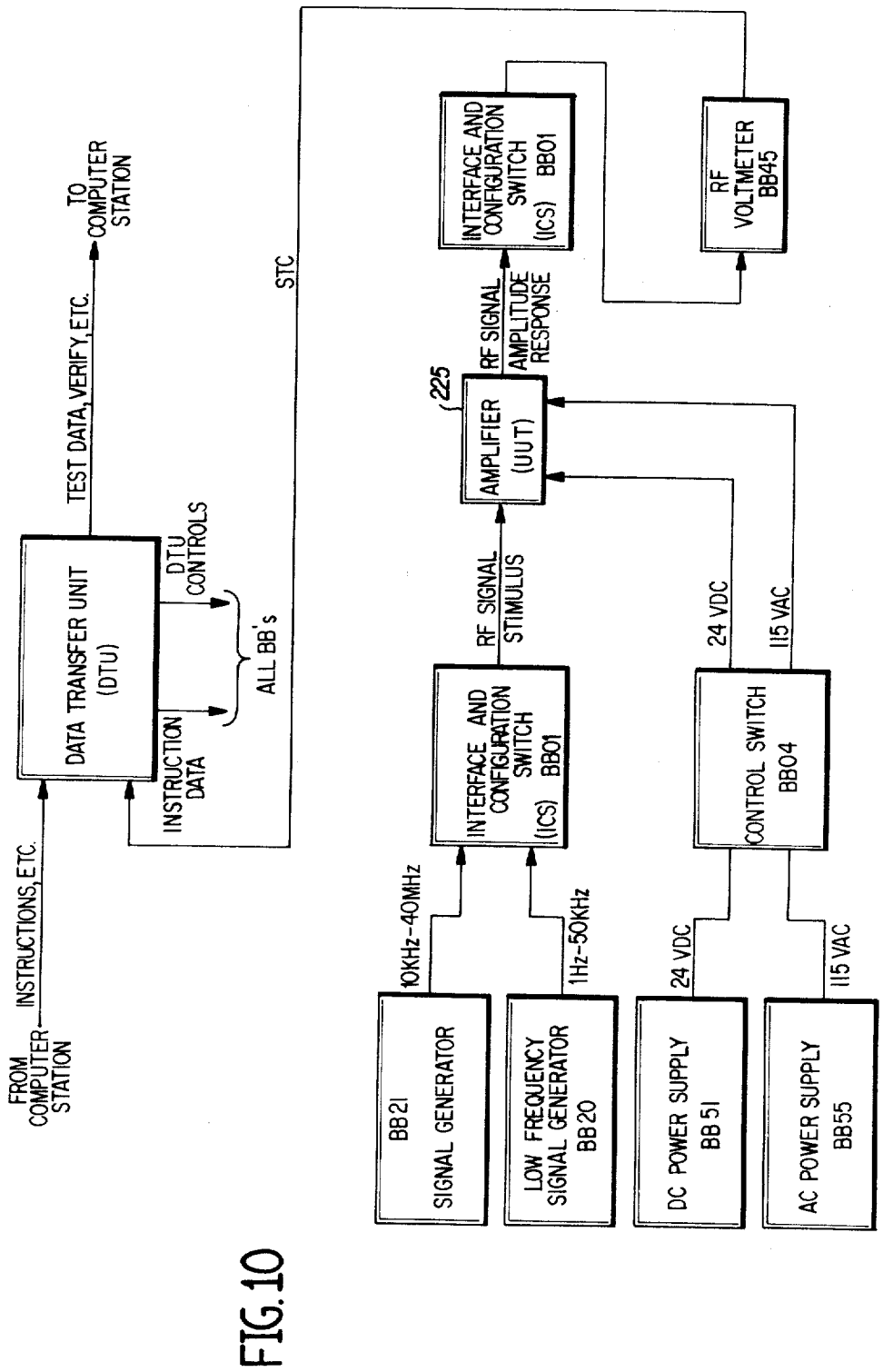
FIG. 10 is a block diagram of another configuration of building blocks for performing a test.

Another configuration of building blocks within the test station for execution of a test program is shown in FIG. 10. Let it be assumed, for example, that the test system is required to perform an amplifier gain check for an amplifier unit 225. Interface and configuration switches BB01 in both the stimulus and the measurement sections and a control switch BB04 in the former are commanded, in accordance with instructions issued by the computer via the DTU for the specific test program, to provide connecting paths as shown in the figure. Thereby, signal generator BB 21 and low frequency signal generator BB 20, previously described, are connected via the stimulus section interface and configuration switch (ICS) BB 01 for application of a desired output as an RF signal stimulus to the amplifier unit (UUT) 225. The control switch BB 04 operates to couple the outputs of programmable DC power supply BB 51 and AC power supply BB 55 to appropriate input terminals of amplifier unit 225. In response to further test instructions the DTU thru-puts appropriate commands to the stimulus building blocks to establish the desired voltages from DC and AC power supplies BB 51 and 55, and to select an appropriate RF stimulus from one of the two signal generators. The amplified RF signal constituting the response signal of amplifier 225 is routed to an RF voltmeter BB 45 in the measurement section through an ICS BB 01. Accordingly, RF voltmeter BB 45 supplies a coded signal representative of the amplifier output signal to its associated BCU storage register. In response to DCLK pulses supplied to the building blocks on the system trunk cable, the data stored in the BCU register is shifted out on the SDB to the DTU and thereafter to the computer. At the computer the amplifier gain is derived by dividing the amplitude of the amplifier input signal into the amplifier output signal. This result is compared with the specified gain transfer characteristic for the particular amplifier unit used as the UUT to determine test acceptance or failure. If the test result is within an allowable tolerance, the next test is performed; for example, a check of the frequency response of the amplifier unit. In that event, the test setup remains essentially the same as that depicted in FIG. 10, and the DTU merely furnishes computer instructions to the signal generator BB's to provide output signal frequencies covering the operating range of the amplifier unit. As in the previous example the response of the unit under test to the RF signal stimulus is measured by RF voltmeter BB 45 and the results again reported to the computer via the BCU and the DTU.

Figure 11:
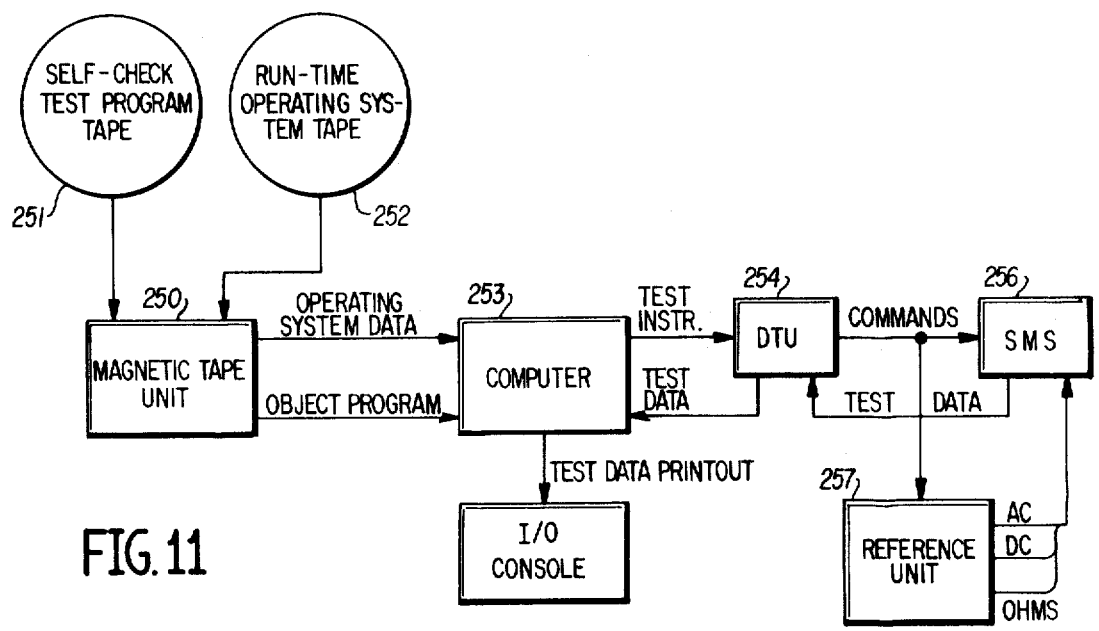
FIG. 11 is a block diagram of the test system in a self-check mode.

The configuration of the test system for self-check testing is shown in FIG. 11. As previously observed, the operating status of the test station must be checked periodically to determine the accuracy of the building blocks is within specified limits for each, and that any faulty or malfunctioning BB's within the system may be uncovered and replaced, or adjusted for proper operation. During self-check testing the magnetic tape unit 250 supplies the object program and operating system program as prescribed by the self-check test program tape 251 and the run-time operating system tape 252 to the computer 253. When the test instructions from the computer direct the DTU 254 to perform a self-check, the instruction is processed and the resulting output of the DTU is supplied to the computer as test data. An evaluation of this returned test data is performed by the computer using the known bit pattern which had been supplied as the test instruction.

Upon determination by the computer that the DTU has correctly responded to the test instruction and is therefore capable of supplying proper commands to the SMS, 256, test instructions in accordance with the object program are directed to the SMS via the DTU. Initial commands are directed to a reference BB 256 which supplies standard outputs for measurement by building blocks in the measurement section. By way of example, the digital multimeter BB 10 is checked for accuracy using precise AC, DC, and resistance standards as inputs thereto. The multimeter is directed to measure each standard and to report the results as test data. At the computer, the measured results are compared with known standards to determine whether these results are within specified tolerances. An I/O console 258 at the DTU prints out the test results supplied by computer to provide a record of actual measured value versus associated standards. If the comparison performed by the computer indicates that the digital multimeter has passed the accuracy requirements of the test, the multimeter is used to check other appropriate building blocks within SMS 256. Each building block is individually programmed for a self-check configuration to remove the normal input and to substitute therefor the known inputs. After each building block is proven to be operational within specified limits the test building block is usable to test other building blocks. This process is continued until all of the building blocks within the SMS section have been self-checked. Accordingly, the invention eliminates the need for additional support test equipment, placing the entire self-test capability within the confines of the test system itself.

We claim:

1. Automatic test equipment for detecting malfunctions in the operation of any of a plurality of dissimilar electronic units, comprising a computer station and a test station, said computer station including a plurality of stores containing test programs each applicable respectively to a distinct and different one of said electronic units, program selection means for selectively retrieving a test program applicable to a selected one of said units from one of said stores, computer means responsive to the retrieved test program to generate test instructions designating tests to be performed on said selected unit, upon receipt of a signal verifying implementation of each test instruction following the first test instruction prior to generating the next test instruction, said test station including data transfer means responsive to the test instructions generated by said computer means for issuing addressed function and data commands for implementing the tests to be performed on said selected unit as designated by said test instructions, and for issuing said verification signal to said computer means upon implementation of each instruction, stimulus means including a plurality of normally unconnected programmable functional modules, each having a repertoire of functions in the form of test routines the respective functional module is capable of performing, and each functional module including respective buffer control means responsive to function commands respectively addressed thereto to enable the respectively associated functional module to assume a coupled configuration conforming to said function command, said enabled functional module responsive to data commands to supply stimuli conforming to said data commands to said selected unit, provided said stimuli are within the repertoire of said respectively associated functional module, measurement means including a plurality of further normally unconnected programmable functional modules each having a repertoire of functions in the form of test routines the respective functional module is capable of performing, and each functional module including respective buffer control means responsive to commands respectively addressed thereto to enable the respectively associated further functional module to assume a coupled configuration conforming to said function command, said further enabled functional module responsive to data commands to measure operational performance of said selected unit in response to said stimuli, and for generating test data representative of the measured operational performance, provided said operational performance measurements are within the repertoire of said respectively associated further functional modules, and each of said buffer control means being responsive to the enabling of a functional module by another buffer control means in the respective measurement means and stimulus means to inhibit its respectively associated functional module means from operating while such other functional module is enabled, interface means for coupling a desired electronic unit to said test station as the unit selected for test, said computer means responsive to said test data to evaluate the test data in comparison with stored data representative of acceptable operational performance limits for said selected unit in response to said stimuli, and to generate results of said evaluation indicative of acceptability or of unacceptability of performance of said selected unit, said test station further including means responsive to said results generated by said computer means to display said acceptability or failure.

2. The automatic test equipment according to claim 1, wherein said data transfer means is responsive to the completion of a selected test program to issue commands for uncoupling said functional modules of said stimulus means and said measuring means from their respective coupled configurations assumed in response to previous commands, in preparation for reconfiguration according to the next selected test program.

3. Automatic test equipment according to claim 1 wherein said functional modules of said stimulus means and said measurement means retain their respective coupled configurations assumed in response to the last commands issued by said data transfer means prior to completion of the selected test program, until reconfiguration by the next selected test program.

4. The automatic test equipment according to claim 1, wherein the tests designated by said test instructions are performed in sequence on said selected unit, and said computer means is responsive to an evaluation of unacceptable operational performance of the selected unit in response to any given test in said sequence to stop the test program and to supply the evaluation results indicative of unacceptability of said selected unit to said display means.

5. The automatic test equipment according to claim 1, wherein at least one of said test programs contains self-check test instructions for tests to determine the acceptability or unacceptability of operational performance of any of said functional modules, and said functional modules in each of said stimulus means and said meansurement means are responsive to applicable commands derived from said self-check test instructions to assume a configuration in which a predetermined one of said functional modules is the unit selected for test.

6. The automatic test equipment according to claim 5, wherein said data transfer means includes means responsive to some of said self-check test instructions for configuration to perform tests of its own operational performance.

7. The automatic test equipment according to claim 1, wherein said test station further includes means for actuating said program selection means at said computer station to retrieve a desired program from one of said stores.

* * * * *